(12) United States Patent
Ni et al.

(10) Patent No.: US 10,716,032 B2
(45) Date of Patent: Jul. 14, 2020

(54) PATH PROCESSING METHOD AND APPARATUS, AND TERMINAL

(71) Applicant: Huawei Technologies Co., Ltd., Shenzhen (CN)

(72) Inventors: Hui Ni, Beijing (CN); Yongcui Li, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 3 days.

(21) Appl. No.: 16/001,609

(22) Filed: Jun. 6, 2018

(65) Prior Publication Data
US 2018/0288655 A1   Oct. 4, 2018

Related U.S. Application Data

(63) Continuation of application No. PCT/CN2015/099165, filed on Dec. 28, 2015.

(51) Int. Cl.
*H04W 36/36* (2009.01)
*H04W 36/00* (2009.01)

(52) U.S. Cl.
CPC ...... *H04W 36/0011* (2013.01); *H04W 36/00* (2013.01); *H04W 36/36* (2013.01)

(58) Field of Classification Search
CPC . H04W 36/0011; H04W 36/00; H04W 36/36; H04L 41/503; H04L 43/0811; H04L 4/302
See application file for complete search history.

(56) References Cited

U.S. PATENT DOCUMENTS

| 2011/0199987 A1 | 8/2011 | Rommer et al. |
| 2012/0307799 A1 | 12/2012 | Taleb et al. |
| 2013/0229910 A1* | 9/2013 | McKnight, Jr. ....... H04W 24/04 370/218 |

(Continued)

FOREIGN PATENT DOCUMENTS

| CN | 101217794 A | 7/2008 |
| CN | 101384084 A | 3/2009 |

(Continued)

OTHER PUBLICATIONS

Huitema, "Multi-homed TCP, draft-huitema-multi-homed-01", Network Working Group, Internet Draft, IETF, (May 1995).

*Primary Examiner* — Mohamed A Kamara
(74) *Attorney, Agent, or Firm* — Leydig, Voit & Mayer, Ltd.

(57) ABSTRACT

This application discloses a path processing method and apparatus, and a terminal. In the path processing method, user equipment may determine, based on connection parameter information corresponding to at least one existing packet data network (PDN) connection, whether a target PDN connection satisfying a target connection condition exists in the at least one existing PDN connection. When the target PDN connection satisfying the target connection condition exists, the user equipment may transmit a service packet by using the target PDN connection. When the target PDN connection satisfying the target connection condition does not exist, the user equipment may initiate establishment of the target PDN connection, to transmit a service packet by using the established target PDN connection. As can be learned, when transmitting the service packet, the user equipment may transmit the service packet by using the target PDN connection satisfying the target connection condition.

19 Claims, 2 Drawing Sheets

(56) References Cited

U.S. PATENT DOCUMENTS

| | | |
|---|---|---|
| 2013/0308527 A1 | 11/2013 | Chin et al. |
| 2013/0308604 A1 | 11/2013 | Jiang et al. |
| 2014/0169330 A1 | 6/2014 | Rommer et al. |
| 2014/0169332 A1 | 6/2014 | Taleb et al. |
| 2015/0142993 A1* | 5/2015 | Blanc .............. G06F 13/387 710/16 |
| 2015/0319664 A1* | 11/2015 | Perras .............. H04W 36/22 370/331 |
| 2015/0327110 A1 | 11/2015 | Jeong et al. |
| 2015/0358893 A1 | 12/2015 | Laselva et al. |
| 2016/0135072 A1* | 5/2016 | Wang .............. H04W 8/082 370/237 |
| 2016/0183156 A1 | 6/2016 | Chin et al. |
| 2016/0234092 A1* | 8/2016 | Avery .............. H04L 43/16 |
| 2017/0064585 A1 | 3/2017 | Kim et al. |
| 2017/0105155 A1* | 4/2017 | Zhao .............. H04L 45/22 |
| 2018/0063778 A1 | 3/2018 | Enomoto et al. |

FOREIGN PATENT DOCUMENTS

| | | |
|---|---|---|
| CN | 101730071 A | 6/2010 |
| CN | 102137474 A | 7/2011 |
| CN | 102547878 A | 7/2012 |
| CN | 102638870 A | 8/2012 |
| CN | 102868999 A | 1/2013 |
| CN | 102917443 A | 2/2013 |
| CN | 103229546 A | 7/2013 |
| CN | 104869660 A | 8/2015 |
| CN | 104937995 A | 9/2015 |
| JP | 2013519279 A | 5/2013 |
| RU | 2455767 C2 | 7/2012 |
| WO | 2014130091 A1 | 8/2014 |
| WO | 2015013567 A1 | 1/2015 |
| WO | 2015100553 A1 | 7/2015 |
| WO | 2015170858 A1 | 11/2015 |
| WO | 2015174456 A1 | 11/2015 |

\* cited by examiner

PATH PROCESSING METHOD AND APPARATUS, AND TERMINAL

CROSS-REFERENCE TO RELATED APPLICATIONS

This application is a continuation of International Application No. PCT/CN2015/099165, filed on Dec. 28, 2015, the disclosure of which is hereby incorporated by reference in its entirety.

TECHNICAL FIELD

The present disclosure relates to the field of communications technologies, and in particular, to a path processing method and apparatus, and a terminal.

BACKGROUND

A core network is an important part of an evolved packet system (EPS). Key logical network elements of a core network may include a mobility management entity (MME), a serving gateway (S-GW), a packet data network gateway (P-GW), a home subscriber server (HSS), and the like. The P-GW is a gateway connected to an external data network, and is a user plane anchor between an access network and a non-access network. To be specific, user equipment may establish a packet data network (PDN) connection by using the P-GW, to access the external data network. When the user equipment moves, an IP address and uplink and downlink paths of the user equipment need to be anchored at a forwarding plane device such as the P-GW, to ensure service continuity when a user moves.

However, it is found in practice that when user equipment moves, service packet transmission paths of the user equipment need to be anchored at a source forwarding plane network element, leading to long uplink and downlink paths and a relatively long network latency. As communications technologies develop, broadband access technologies for user equipment, such as wireless-fidelity (Wi-Fi), Worldwide Interoperability for Microwave Access (WiMAX), and a third-generation or fourth-generation mobile communications technology 3G/4G, have made significant progress. In addition, an EPS system also supports a plurality of PDN connections between user equipment and a PDN network, allowing the user equipment to have a plurality of PDN connections to a target node at the same time. However, for user equipment having a plurality of PDN connections, how to select a proper PDN connection from the plurality of PDN connections to improve service packet transmission quality is a problem that urgently needs to be resolved.

SUMMARY

This application discloses a path processing method and apparatus, and a terminal, to select a proper PDN connection for user equipment to improve service packet transmission quality.

According to a first aspect, this application discloses a path processing method. In the method, a user equipment may determine, based on connection parameter information corresponding to at least one existing PDN connection, whether a target PDN connection satisfying a target connection condition exists in the at least one existing PDN connection. When the target PDN connection satisfying the target connection condition exists, the user equipment may transmit a service packet by using the target PDN connection. When the target PDN connection satisfying the target connection condition does not exist, the user equipment initiates establishment of the target PDN connection satisfying the target connection condition, to transmit a service packet by using the established target PDN connection.

When a handover is caused by movement of the user equipment, or when the user equipment initiates a new service flow, the user equipment may select, by using the path processing method according to the first aspect, the target PDN connection satisfying the target connection condition, and perform transmission by using the target PDN connection, thereby reducing a service transmission latency, improving service transmission quality, and so on.

According to the first aspect, in a first possible implementation of the first aspect, the connection parameter information of the PDN connection may include at least one of a location area, a service feature indicator, and a priority. The priority of the PDN connection is a priority of a PDN connection selected as the target PDN connection. The location area of the PDN connection may be represented by using a cell identifier list, a physical location range, an area identifier list, a route distinguisher list, a forwarding identifier list, a base station identifier list, or the like. The service feature indicator of the PDN connection may include a transmission latency, a packet loss rate, and the like of the PDN connection.

According to the first aspect or the first possible implementation of the first aspect, in a second possible implementation of the first aspect, the target PDN connection satisfying the target connection condition may satisfy one or more of the following conditions: a location area corresponding to the target PDN connection is or includes a current location of the user equipment; a service feature indicator corresponding to the target PDN connection satisfies a service feature condition required by a service flow; and the target PDN connection has a highest priority.

According to the first aspect or the first or the second possible implementation of the first aspect, in a third possible implementation of the first aspect, the connection parameter information corresponding to the at least one existing packet data network PDN connection is obtained from a control plane network element in a process of establishing each PDN connection, or is obtained from a broadcast message of a wireless access point, or is obtained by the user equipment from an access network discovery and selection function (ANDSF) server.

According to any one of the first aspect or the first to the third possible implementations of the first aspect, in a fourth possible implementation of the first aspect, the initiating, by the user equipment, establishment of the target PDN connection satisfying the target connection condition may be: sending, by the user equipment, a PDN connection establishment request to the control plane network element. The PDN connection establishment request may include the current location of the user equipment, and the current location of the user equipment is used to select a forwarding plane network element. The service transmission condition or the service transmission quality such as a transmission latency and a packet loss rate required by the service flow can also be satisfied by transmitting the service packet by using the established target PDN connection.

According to a second aspect, this application further discloses a path processing apparatus. The apparatus may include: a determining module, configured to determine, based on connection parameter information corresponding to at least one existing PDN connection, whether a target PDN connection satisfying a target connection condition exists in the at least one existing PDN connection; and a communications module, configured to: when the target PDN connection satisfying the target connection condition exists, transmit a service packet by using the target PDN connection. The communications module is further configured to: when the target PDN connection satisfying the target connection condition does not exist, initiate establishment of the target PDN connection satisfying the target connection condition, to transmit a service packet by using the established target PDN connection. The target connection condition may be preconfigured in the path processing apparatus. The path processing apparatus may alternatively include other modules or units, and executes any one or more of the steps or implementations of the path processing method disclosed in the first aspect.

According to a third aspect, this application further discloses user equipment. The user equipment may include a processor, a memory, and a communications interface. The processor is configured to determine, based on connection parameter information corresponding to at least one existing PDN connection, whether a target PDN connection satisfying a target connection condition exists in the at least one existing PDN connection. The memory is configured to store the connection parameter information corresponding to the at least one existing PDN connection. The processor is further configured to: when the target PDN connection satisfying the target connection condition exists, transmit a service packet by using the communications interface and the target PDN connection. The processor is further configured to: when the target PDN connection satisfying the target connection condition does not exist, initiate, by using the communications interface, establishment of the target PDN connection satisfying the target connection condition, to transmit a service packet by using the established target PDN connection. The target connection condition may be preconfigured in the user equipment. The user equipment may further execute any one or more of the steps or implementations of the path processing method disclosed in the first aspect.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Figure 1:
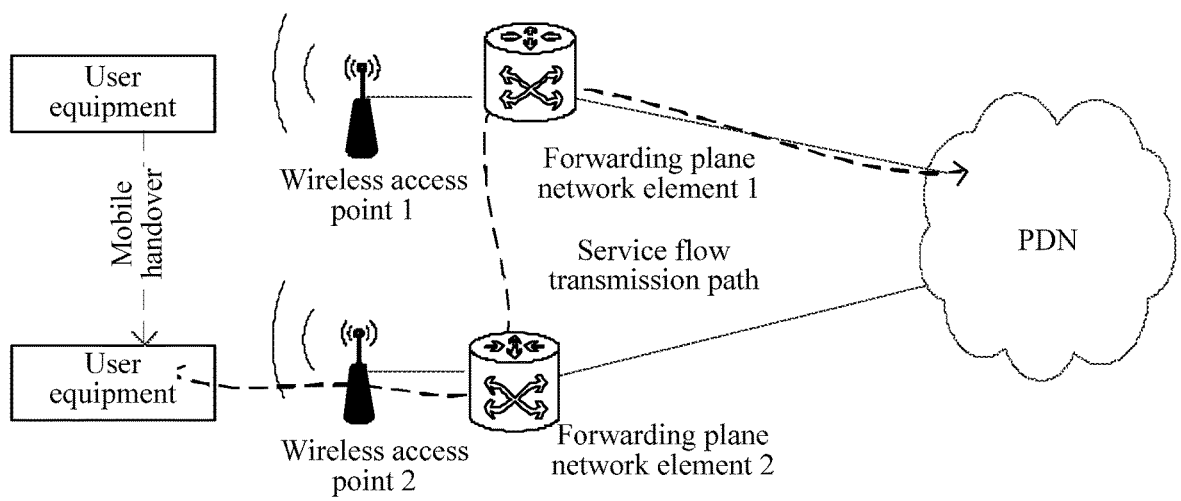
FIG. 1 is a schematic diagram of a service flow transmission path after user equipment moves according to an embodiment of the present disclosure.

Referring to FIG. 1, FIG. 1 is a schematic diagram of a service flow transmission path after a user equipment moves according to an embodiment of the present disclosure. The user equipment shown in FIG. 1 may be any mobile or portable electronic device, including, but not limited to, a mobile phone, a mobile computer, a tablet computer, a personal digital assistant (PDA), a media player, a smart television, or a combination of two or more of the foregoing devices. This is not limited in this embodiment of the present disclosure. A forwarding plane network element shown in FIG. 1 may include a S-GW, a P-GW, or a forwarding plane network element of the S-GW/P-GW. The S-GW is a data anchor in an access network, is configured to route and forward packet data, and is an anchor for local mobility management. The P-GW is a gateway connected to an external data network, and is a user plane anchor between an access network and a non-access network. The user equipment needs to establish a PDN connection by using a forwarding plane device, to access external packet data networks. The packet data networks may be the Internet, a virtual private network, an IP multimedia service network, a Wireless Application Protocol network provided by an operator, or the like. The forwarding plane network element of the S-GW/P-GW is a logical unit having a forwarding plane function after control and forwarding of the S-GW/P-GW are separated, and is configured to forward a user packet. As shown in FIG. 1, service flow transmission paths for transmitting service packets when the user equipment moves need to be anchored at a source forwarding plane network element (that is, a forwarding plane network element 1) at which a service flow transmission path is anchored before movement. That is, a service packet needs to be transmitted to a PDN network by using the forwarding plane network element 2 and the forwarding plane network element 1. Consequently, after movement, a service flow path initiated by using the PDN connection is relatively long, and service transmission quality is poor.

Figure 2:
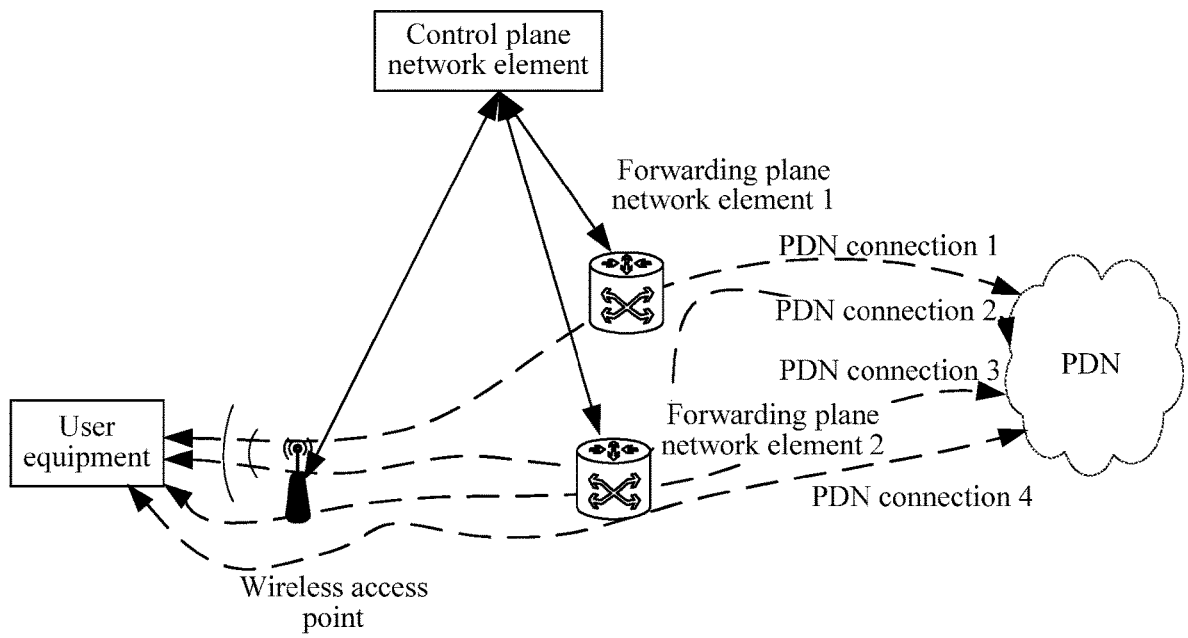
FIG. 2 is a schematic diagram of a system architecture with a plurality of PDN connections according to an embodiment of the present disclosure.

To resolve the foregoing problem, an EPS system supports a plurality of PDN connections between the user equipment and a PDN network, and a service packet may be migrated to a proper PDN connection to reduce a network latency and improve service transmission quality. Referring to FIG. 2, FIG. 2 is a schematic diagram of a system architecture with a plurality of PDN connections according to an embodiment of the present disclosure. As shown in FIG. 2, the system architecture with a plurality of PDN connections includes a user equipment, a wireless access point associated with the user equipment at a current location (where the wireless access point includes at least one of a 3G wireless access point 1, a 4G wireless access point 2, or a Wi-Fi wireless access point 3), a control plane network element, a forwarding plane network element 1, a forwarding plane network element 2, and the like. The wireless access point is a device providing wireless access for the user equipment, and includes, but is not limited to, a base station in 3G/4G, Long Term Evolution (LTE) of Universal Mobile Telecommunications System, or WiMAX, or wireless access point in Wi-Fi. The control plane network element is configured to be responsible for performing mobility management in a mobile network and allocating a forwarding plane device having an optimal path for each PDN connection. The control plane network element may include some functions of a MME and a mobile gateway controller and the like. The forwarding plane network element is configured to provide IP address anchoring for the user equipment and is, for example, a physical or virtual forwarding device such as a P-GW, a router, or a switch. As shown in FIG. 2, the user equipment may establish a plurality of PDN connections by using a same forwarding plane network element or a plurality of forwarding plane network elements, to access a PDN network. Each of the plurality of PDN connections is a communication connection used by the user equipment to access the PDN network based on one IP address. The plurality of PDN connections enable the user equipment to simultaneously have a plurality of paths to a target node, for example, a path 1 based on a PDN connection 1, a path 2 based on a PDN connection 2, a path 3 based on a PDN connection 3, and a path 4 based on a PDN connection 4. However, for user equipment having a plurality of PDN connections, how to select a proper PDN connection to optimize a service transmission path and improve service transmission quality is a problem that urgently needs to be resolved.

To resolve the foregoing problem, an embodiment of the present disclosure discloses a path processing method, to select a proper PDN connection for user equipment to optimize a service transmission path and improve service transmission quality. Details descriptions are provided below.

Figure 3:
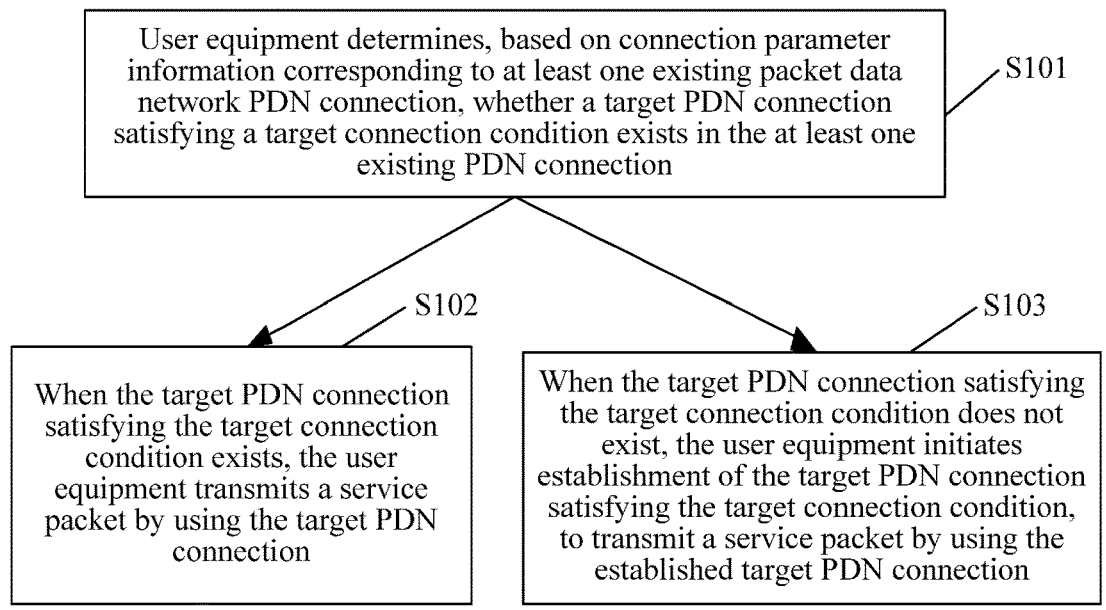
FIG. 3 is a schematic flowchart of a path processing method according to an embodiment of the present disclosure.

Referring to FIG. 3, FIG. 3 is a schematic flowchart of a path processing method according to an embodiment of the present disclosure. As shown in FIG. 3, the path processing method may include the following steps:

S101: The user equipment determines, based on connection parameter information corresponding to at least one existing packet data network PDN connection, whether a target PDN connection satisfying a target connection condition exists in the at least one existing PDN connection.

In this embodiment of the present disclosure, when a handover is caused by movement of the user equipment, the user equipment may perform steps S101 to S104 to select a proper path for a service flow that is being transmitted by the user equipment, to reduce a service packet transmission latency; or when the user equipment initiates a new service flow, which may also be a service sub-flow initiated by the user equipment before the mobile handover, the user equipment may perform steps S101 to S104 to select a proper path for the new service flow, to reduce a service packet transmission latency. The handover caused by movement of the user equipment includes a cell handover in a cellular network such as a 3G/4G network, a wireless access point handover in a Wi-Fi or WiMAX network, and the like. This is not limited in this embodiment of the present disclosure.

In this embodiment of the present disclosure, the connection parameter information corresponding to the existing PDN connection includes at least one of a service feature indicator that the PDN connection can satisfy, a location area corresponding to the PDN connection, or a priority corresponding to the PDN connection. The priority is used to indicate that when there are a plurality of PDN connections satisfying the target connection condition, a target PDN connection is selected based on the priority.

In this embodiment of the present disclosure, the connection parameter information corresponding to the PDN connection is obtained from a control plane network element in a process of establishing each PDN connection, or is obtained from a broadcast message of a base station, or is obtained from an access network discovery and selection function (ANDSF) server. For example, the obtaining of the connection parameter information from the control plane network element in the process of establishing each PDN connection may include the following steps: The user equipment sends a connection establishment request to a wireless access point (for example, a base station in 3G/4G, LTE, or WiMAX, or a wireless access point in Wi-Fi). The connection establishment request includes current location information of the user equipment (for example, a cell identifier, a base station identifier, or a physical location identifier for positioning). The wireless access point sends the connection establishment request to the control plane network element. After receiving the connection establishment request, the control plane network element selects, for the user equipment based on a location indicated by the current location information of the user equipment and service ranges of forwarding plane network elements, a forwarding plane network element that has an optimal path and that satisfies a feature condition of a service to be transmitted by using the connection, and determines location area information of the connection (where a location range indicated by the location area information includes the location indicated by the current location information of the user equipment). The control plane network element or the forwarding plane device may assign, to the connection, a PDN connection address anchored at the forwarding plane device. The control plane network element sends a connection establishment response message to the wireless access point. The connection establishment response message includes the connection parameter information of the connection. The connection parameter information of the connection uses an IP address as an index, and is for example, any one or more of the location area information, a service feature indicator that satisfies the feature condition of the service to be transmitted by using the connection, or a priority.

In this embodiment of the present disclosure, the connection parameter information corresponding to the PDN connection may be stored in the user equipment in a form of a relational table. Alternatively, a correspondence between the PDN connection and the location area information may be implemented in another manner, for example, by using a hash algorithm. Table 1 is a relational table of connection parameter information corresponding to a plurality of PDN connections that is determined by user equipment according to an embodiment of the present disclosure. As shown in Table 1, in the relational table, an IP address of each PDN connection is used as an index. The IP address is a logical address that is assigned when the PDN connection is established or that is used to access a network. Each PDN connection uses an IP address as an index. A location area of each PDN connection, a service feature indicator such as a latency and a packet loss rate that each PDN connection can satisfy, and a priority of each PDN connection are correspondingly stored. The location area is an area to which the PDN connection is applicable, and may be represented by using a cell identifier list, a physical location range, an area identifier list, a route distinguisher list, a forwarding identifier list, a base station identifier list, or the like.

TABLE 1

| Relational table | | | |
|---|---|---|---|
| $IP_1$ | Location area 1 | Service feature indicator 1 | Priority 1 |
| $IP_2$ | Location area 2 | Service feature indicator 2 | Priority 2 |

TABLE 1-continued

Relational table

| | | | |
|---|---|---|---|
| $IP_3$ | Location area 3 | Service feature indicator 3 | Priority 3 |
| $IP_4$ | Location area 4 | Service feature indicator 4 | Priority 4 |

S102: When the target PDN connection satisfying the target connection condition exists, the user equipment transmits a service packet by using the target PDN connection.

In this embodiment of the present disclosure, the target connection condition may be preconfigured in the user equipment. The target connection condition may include at least one of the following: a location area corresponding to the PDN connection includes or is a current location of the user equipment; a service feature indicator of the PDN connection satisfies a service feature condition required by the service flow; and the PDN connection has a highest priority. The service feature condition may be a QCI (QoS Class Identifier) value such as a maximum latency and packet loss rate required by the service flow. The QCI value is used for measuring a particular packet forwarding behavior provided for the service flow. If a base station identifier list of the location area of the PDN connection includes a current base station identifier of the user equipment, it indicates that the location area of the PDN connection includes the current location of the user equipment. Similarly, if a location area indicated by physical location information of the PDN connection is or includes a location indicated by physical location information obtained by the user equipment by positioning, it indicates that the location area of the PDN connection includes the current location of the user equipment.

In this embodiment of the present disclosure, the service packet transmitted by the user equipment by using the target PDN connection may be a packet of a service flow initiated by the user equipment before the mobile handover, or may be a packet of a new service flow initiated by a user equipment after the mobile handover. This is not limited in this embodiment of the present disclosure.

S103: When the target PDN connection satisfying the target connection condition does not exist, the user equipment initiates establishment of the target PDN connection satisfying the target connection condition, to transmit a service packet by using the established target PDN connection.

In this embodiment of the present disclosure, that the user equipment initiates establishment of the target PDN connection satisfying the target connection condition includes the following steps:

The user equipment sends a PDN connection establishment request to the control plane network element by using the current base station. The PDN connection establishment request includes the current location and/or the service feature condition of the user equipment. The control plane network element selects a forwarding plane network element for the user equipment based on the current location and/or the service feature condition of the user equipment. The forwarding plane network element or the control plane network element assigns an IP address to the PDN connection. Correspondingly, the user equipment may receive a PDN connection establishment response message returned by the control plane network element by using the base station. The PDN connection establishment response message includes the IP address of the PDN connection, and may further include at least one of the location area, the service feature indicator, and the priority corresponding to the PDN connection.

As can be learned, in the path processing method shown in FIG. 3, the user equipment determines, based on the connection parameter information corresponding to the at least one existing PDN connection, whether the at least one existing PDN connection includes the target PDN connection satisfying the target connection condition; when the target PDN connection satisfying the target connection condition exists, the user equipment may transmit the service packet by using the target PDN connection; or when the target PDN connection satisfying the target connection condition does not exist, the user equipment may initiate establishment of the target PDN connection satisfying the target connection condition, to transmit the service packet by using the established target PDN connection. As can be learned, in this embodiment of the present disclosure, when the service packet is transmitted, the service packet may be transmitted by using the target PDN connection satisfying the target connection condition, thereby reducing a service transmission latency, improving service transmission quality, and so on.

For example, a plurality of PDN connections maintained by the user equipment after a mobile handover are shown in FIG. 2. Before the handover, a service packet of a service flow of the user equipment is transmitted by using the PDN connection 2 in FIG. 2. After the handover, the user equipment may determine to use the PDN connection 3 for service transmission of the service flow by using the path processing method in this embodiment. Because the PDN connection 3 may directly connect to a PDN network by using a forwarding plane device 3, a service transmission latency of the service flow is reduced. When the user equipment initiates a new service flow, PDN connections satisfying the target connection condition that the location area corresponding to the PDN connection is or includes the current location of the user equipment include the PDN connection 3 and the PDN connection 4. In the PDN connection 3 and the PDN connection 4, the PDN connection 4 satisfies the target connection condition that the service feature indicator corresponding to the PDN connection satisfies a service feature condition required by the new service flow or the PDN connection has a relatively high priority. The user equipment may perform service packet transmission for the new service flow by using the PDN connection 4, to reach service transmission quality such as a transmission latency or a packet loss rate required by the new service flow. Optionally, if neither of the service feature indicators corresponding to the PDN connection 3 and the PDN connection 4 satisfies the service feature condition required by the new service flow, the user equipment may establish, by sending a connection establishment request to the control plane network element, the target PDN connection satisfying the target connection condition, and transmit the service packet by using the established target PDN connection, to reach service transmission quality such as a transmission latency or a packet loss rate required by the new service flow.

Figure 4:
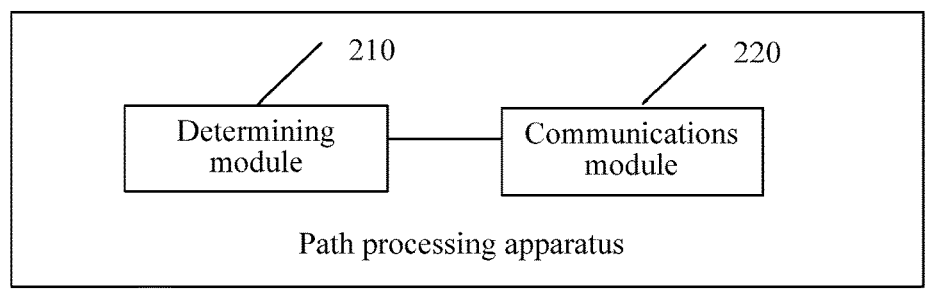
FIG. 4 is a schematic structural diagram of a path processing apparatus according to an embodiment of the present disclosure.

Referring to FIG. 4, FIG. 4 is a schematic structural diagram of a path processing apparatus according to an embodiment of the present disclosure. As shown in FIG. 4, the path processing apparatus may include a determining module 210 and a communications module 220.

The determining module 210 is configured to determine, based on connection parameter information corresponding to at least one existing PDN connection, whether a target PDN connection satisfying a target connection condition exists in the at least one existing PDN connection.

The communications module 220 is configured to: when the target PDN connection satisfying the target connection condition exists, transmit a service packet by using the target PDN connection.

The communications module 220 is further configured to: when the target PDN connection satisfying the target connection condition does not exist, initiate establishment of the target PDN connection satisfying the target connection condition, to transmit a service packet by using the established target PDN connection.

In this embodiment of the present disclosure, the connection parameter information may include at least one of a location area, a service feature indicator, and a priority. The priority is a priority of a PDN connection selected as the target PDN connection. The target PDN connection satisfying the target connection condition satisfies one or more of the following conditions: a location area corresponding to the target PDN connection is or includes a current location of the user equipment of the path processing apparatus; a service feature indicator corresponding to the target PDN connection satisfies a service feature condition required by a service flow; and the target PDN connection has a highest priority.

In this embodiment of the present disclosure, the connection parameter information corresponding to the at least one existing PDN connection is obtained from a control plane network element in a process of establishing each PDN connection, or is obtained from a broadcast message of a wireless access point, or is obtained by the user equipment of the path processing apparatus from an access network discovery and selection function (ANDSF) server.

In this embodiment of the present disclosure, that the communications module 220 initiates establishment of the target PDN connection satisfying the target connection condition may be for example: the communications module 220 sends a PDN connection establishment request to the control plane network element. The PDN connection establishment request includes the current location of the user equipment, and the current location of the user equipment is used to select a forwarding plane network element. The PDN connection establishment request may further include a service feature condition required by the service flow.

In this embodiment of the present disclosure, the path processing apparatus may execute any one or more of the steps or implementations of the path processing method shown in FIG. 3. This is not limited in this embodiment of the present disclosure.

Figure 5:
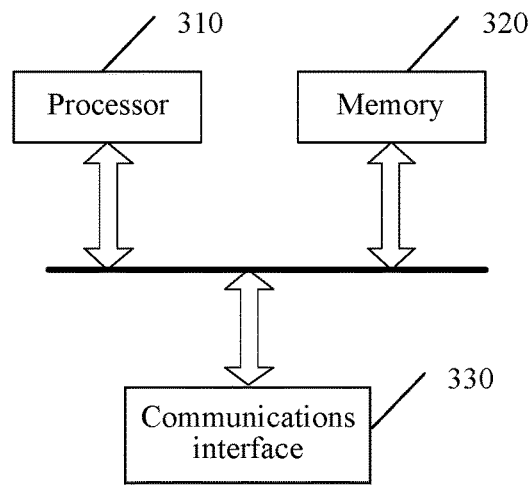
FIG. 5 is a schematic structural diagram of user equipment according to an embodiment of the present disclosure.

Referring to FIG. 5, FIG. 5 is a schematic structural diagram of a user equipment according to an embodiment of the present disclosure. As shown in FIG. 5, the user equipment may include a processor 310, a memory 320, and a communications interface 330. A person skilled in the art may understand that the structure of the user equipment shown in FIG. 5 does not constitute a limitation to the present disclosure. The user equipment may be a bus structure or a star structure, and may include more or fewer components than those shown in the figure, or some components may be combined, or a different component deployment may be used.

In an implementation of the present disclosure, the processor 310 is a control center of the user equipment, and connects various parts of the user equipment using various interfaces and circuits. The processor runs or executes a software program and/or module stored in a storage unit, and invokes data stored in the storage unit, to perform various functions and/or data processing of an electronic device. The processor 310 may include an integrated circuit (IC), for example, may include a single packaged IC, or may include a plurality of packaged ICs having same or different functions that are connected. For example, the processor 310 may include only a central processing unit (CPU), or may be a combination of a GPU, a digital signal processor (DSP), and a control core (for example, a baseband core) of a communications unit. In an implementation of the present disclosure, the CPU may include a single computing core, or may include a plurality of computing cores.

In an implementation of the present disclosure, the memory 320 may be configured to store a software program and module. The processor 310 runs the software program and module stored in the memory 320, to implement various functional applications and data processing of the user equipment. The memory 320 mainly includes a program storage area and a data storage area. The program storage area may store an operating system and an application program required by at least one function, such as a path processing program. The data storage area may store data created based on use of the user equipment, and the like. In a specific implementation of the present disclosure, the memory 320 may include a volatile memory, for example, a nonvolatile random access memory (NVRAM for short), a phase change random access memory (PRAM), a magnetoresistive random access memory (MRAM), or the like, and may further include a non-volatile memory, for example, at least one magnetic disk storage device, an electrically erasable programmable read-only memory (EEPROM), or a flash memory device such as a NOR flash memory or a NAND flash memory. The non-volatile memory stores an operating system and an application program executed by a processing unit. The processor 310 loads a running program and data from the non-volatile memory to a memory, and stores digital content in a mass storage apparatus. The operating system includes various components and/or drives that are configured to control and manage routine system tasks such as memory management, storage device control, and power supply management, and that facilitate communication between various software and hardware. In an implementation of the present disclosure, the operating system may be an Android™ system developed by Google, an iOS™ system developed by Apple, a Windows™ operating system developed by Microsoft, or an embedded operating system such as Vxworks™.

In an implementation of the present disclosure, the communications interface 330 is configured to establish a communication channel, so that the user equipment connects to a remote server by using the communication channel and downloads data from the remote server. The communications interface 330 may include a communications module such as a wireless local area network (WLAN) module, a Bluetooth module, or a baseband module, and a radio frequency (RF) circuit corresponding to the communications module, and is configured to perform wireless local area network communication, Bluetooth communication, infrared communication, and/or communication of a cellular communications system, for example, Wideband Code Division Multiple Access (W-CDMA) and/or High Speed Downlink Packet Access (HSDPA). The communications module is configured to control communication of components in the electronic device, and supports direct memory access.

In an implementation of the present disclosure, the processor 310 is configured to determine, based on connection parameter information corresponding to at least one existing PDN connection, whether a target PDN connection satisfying a target connection condition exists in the at least one existing PDN connection. The memory 320 may be configured to store the connection parameter information corresponding to the at least one existing PDN connection. The processor 310 is further configured to: when the target PDN connection satisfying the target connection condition exists, transmit a service packet by using the communications interface 330 and the target PDN connection. The processor 310 is further configured to: when the target PDN connection satisfying the target connection condition does not exist, initiate, by using the communications interface 330, establishment of the target PDN connection satisfying the target connection condition, to transmit a service packet by using the established target PDN connection.

The connection parameter information includes at least one of a location area, a service feature indicator, and a priority. The priority is a priority of a PDN connection selected as the target PDN connection. The target PDN connection satisfying the target connection condition satisfies one or more of the following conditions: a location area corresponding to the target PDN connection is or includes a current location of the user equipment; a service feature indicator corresponding to the target PDN connection satisfies a service feature condition required by a service flow; and the target PDN connection has a highest selection priority.

In this embodiment of the present disclosure, the connection parameter information corresponding to the at least one existing PDN connection is obtained from a control plane network element in a process of establishing each PDN connection, or is obtained from a broadcast message of a wireless access point, or is obtained by the user equipment from an access network discovery and selection function (ANDSF) server.

In this embodiment of the present disclosure, that the processor 310 initiates, by using the communications interface 330, establishment of the target PDN connection satisfying the target connection condition may be: the processor 310 sends a PDN connection establishment request to the control plane network element by using the communications interface 330. The PDN connection establishment request may include the current location of the user equipment, and the current location of the user equipment is used to select a forwarding plane network element.

In this embodiment of the present disclosure, the processor 310 in the user equipment may execute any one or more of the steps or implementations of the path processing method shown in FIG. 3. This is not limited in this embodiment of the present disclosure.

In an embodiment, an embodiment of the present disclosure further discloses a computer storage medium, where the computer storage medium stores a computer program. When the computer program in the computer storage medium is read to a computer, the computer is enabled to complete all steps of the path processing method disclosed in this embodiment of the present disclosure.

It should be noted that, for brief description, the foregoing method embodiments are represented as a series of actions. However, a person skilled in the art should appreciate that the present disclosure is not limited to the described order of the actions, because according to the present disclosure, some steps may be performed in other orders or simultaneously. In addition, a person skilled in the art should also appreciate that all the embodiments described in the specification are example embodiments, and the related actions and modules are not necessarily mandatory to the present disclosure.

A person of ordinary skill in the art may understand that all or some of the steps of the methods in the embodiments may be implemented by a program instructing relevant hardware. The program may be stored in a computer readable storage medium. The storage medium may include a flash memory, a read-only memory (ROM), a random access memory (RAM), a magnetic disk, and an optical disc.

The foregoing describes in detail the path processing method and apparatus, and the user equipment provided in the embodiments of the present disclosure. In this specification, specific examples are used to describe the principle and implementations of the present disclosure, and the description of the embodiments is only intended to help understand the method and core idea of the present disclosure. In addition, a person of ordinary skill in the art may, based on the idea of the present disclosure, make modifications with respect to the specific implementations and the application scope. Therefore, the content of this specification shall not be construed as a limitation to the present disclosure.

What is claimed is:

1. A path processing method, comprising:
   in response to a user equipment (UE) initiating a service flow, determining, by the UE based on connection parameter information corresponding to at least one existing packet data network (PDN) connection, whether there is an existing target PDN connection satisfying a target connection condition among the at least one existing PDN connection, wherein the connection parameter information comprises a service feature indicator, and a service feature indicator corresponding to the existing target PDN connection satisfies a service feature condition required by the service flow; and
   in response to that there is the existing target PDN connection satisfying the target connection condition, transmitting, by the UE, a service packet of the service flow using the existing target PDN connection; and
   in response to that there is no the existing target PDN connection satisfying the target connection condition, initiating, by the UE, establishment of a target PDN connection satisfying the target connection condition, and transmitting the service packet of the service flow using the established existing target PDN connection.

2. The method according to claim 1, wherein the service feature indicator comprises a latency of a PDN connection.

3. The method according to claim 1, wherein the connection parameter information comprises a location area corresponding to a PDN connection.

4. The method according to claim 3, wherein the existing target PDN connection or the target PDN connection is a PDN connection when the location area corresponding to the PDN connection is or comprises a current location of the UE.

5. The method according to claim 1, wherein the connection parameter information comprises a priority of a PDN connection determined as the existing target PDN connection.

6. The method according to claim 5, wherein the existing target PDN connection is a PDN connection or the target PDN connection that has a highest priority.

7. The method according to claim 1, wherein the connection parameter information corresponding to the at least one existing PDN connection is obtained from a control plane network element in a process of establishing each PDN connection.

8. The method according to claim 1, wherein initiating the establishment of the target PDN connection satisfying the target connection condition comprises:
sending, by the UE, a PDN connection establishment request to a control plane network element, wherein the PDN connection establishment request comprises the service feature condition required by the service flow, and the service feature condition required by the service flow is used for selection of a forwarding plane network element.

9. An apparatus, comprising:
a processor; and
a memory storing a program to be executed by the processor, the program comprising instructions that, when executed by the processor, cause the processor to:
in response to a user equipment (UE) initiating a service flow, determine, based on connection parameter information corresponding to at least one existing packet data network (PDN) connection, whether there is an existing target PDN connection satisfying a target connection condition among the at least one existing packet data network (PDN) connection, wherein the connection parameter information comprises a service feature indicator, and a service feature indicator corresponding to the existing target PDN connection satisfies a service feature condition required by the service flow; and
in response to that there is the existing target PDN connection satisfying the target connection condition, transmit a service packet of the service flow using the communications interface and the existing target PDN connection; and
in response to that there is no the existing target PDN connection satisfying the target connection condition, initiate establishment of a target PDN connection satisfying the target connection condition, and transmit the service packet of the service flow using the established target PDN connection.

10. The apparatus according to claim 9, wherein the service feature indicator comprises a latency of a PDN connection.

11. The apparatus according to claim 9, wherein the connection parameter information comprises a location area corresponding to a PDN connection.

12. The apparatus according to claim 11, wherein the target PDN connection or the existing target PDN connection is a PDN connection when the location area corresponding to the PDN connection is or comprises a current location of the user equipment.

13. The apparatus according to claim 9, wherein the connection parameter information comprises a priority of a PDN connection determined as the existing target PDN connection.

14. The apparatus according to claim 13, wherein the target PDN connection or the existing target PDN connection is a PDN connection that has a highest priority.

15. The apparatus according to claim 9, wherein the connection parameter information corresponding to the at least one existing PDN connection is obtained from a control plane network element in a process of establishing each PDN connection.

16. The apparatus according to claim 9, wherein to initiate the establishment of the target PDN connection satisfying the target connection condition, the processor is configured to send a PDN connection establishment request to a control plane network element, wherein the PDN connection establishment request comprises the service feature condition required by the service flow, and the service feature condition required by the service flow is used for selection of a forwarding plane network element.

17. A non-transitory computer-readable medium storing computer instructions for execution by one or more processors, wherein the computer instructions instruct the one or more processors to perform steps comprising:
in response to a user equipment (UE) initiating a service flow, determining, based on connection parameter information corresponding to at least one existing packet data network (PDN) connection, whether there is an existing target PDN connection satisfying a target connection condition among the at least one existing PDN connection, wherein the connection parameter information comprises a service feature indicator, and a service feature indicator corresponding to the existing target PDN connection satisfies a service feature condition required by the service flow; and
in response to that there is the existing target PDN connection satisfying the target connection condition, transmitting, a service packet of the service flow using the existing target PDN connection; and
in response to that there is no the existing target PDN connection satisfying the target connection condition, initiating, establishment of a target PDN connection satisfying the target connection condition, and transmitting the service packet of the service flow using the established target PDN connection.

18. The non-transitory computer-readable medium according to claim 17, wherein the service feature indicator comprises a latency of a PDN connection.

19. The non-transitory computer-readable medium according to claim 17, wherein the initiating the establishment of the target PDN connection satisfying the target connection condition comprises:
sending a PDN connection establishment request to a control plane network element, wherein the PDN connection establishment request comprises the service feature condition required by the service flow, and the service feature condition required by the service flow is used for selection of a forwarding plane network element.

* * * * *

UNITED STATES PATENT AND TRADEMARK OFFICE
CERTIFICATE OF CORRECTION

PATENT NO. : 10,716,032 B2  
APPLICATION NO. : 16/001609  
DATED : July 14, 2020  
INVENTOR(S) : Ni et al.

Page 1 of 1

It is certified that error appears in the above-identified patent and that said Letters Patent is hereby corrected as shown below:

In the Claims

Claim 1: Column 12, Line 45: "using the established existing target PDN connection." should read -- using the established target PDN connection. --.

Claim 6: Column 12, Line 61-62: "target PDN connection is a PDN connection or the target PDN connection that has a highest priority." should read -- target PDN connection or the target PDN connection is a PDN connection that has a highest priority. --.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*